United States Patent [19]

Pfeifer

[11] 4,137,571
[45] Jan. 30, 1979

[54] PROGRAM CONTROL APPARATUS FOR THE PHOTOGRAPHIC OPERATING SEQUENCE OF AN X-RAY PHOTOGRAPHIC INSTALLATION

[75] Inventor: Rolf Pfeifer, Erlangen, Germany

[73] Assignee: Siemens Aktiengesellschaft, Berlin & Munich, Germany

[21] Appl. No.: 791,060

[22] Filed: Apr. 26, 1977

[30] Foreign Application Priority Data

Oct. 22, 1976 [DE] Fed. Rep. of Germany ....... 2647928

[51] Int. Cl.² .............................................. G11C 11/42
[52] U.S. Cl. ........................................ 365/49; 250/320
[58] Field of Search ................... 365/45, 127; 250/320

[56] References Cited

U.S. PATENT DOCUMENTS 3,763,364  10/1973  Peutsch .................................. 365/45

*Primary Examiner*—Terrell W. Fears
*Attorney, Agent, or Firm*—Hill, Gross, Simpson, Van Santen, Steadman, Chiara & Simpson

[57] ABSTRACT

The illustrated embodiment utilizes a series of pre-programmed read-only memories any one of which may be selected to control a photographic operating sequence. The program steps from the selected read-only memory are preferably sequentially selected by means of a pulse generator which successively actuates a sequence counter supplying the read-out address to each of the read-only memories. The outputs of all of the read-only memories are connected with the components of the photographic system to be controlled, a program selector determining which of the read-only memories is to be actually operative. A freely programmable memory is also present which is controlled by input keys so as to be programmable step by step by the operator under the control of the sequence counter which in this case is operated in a step mode. The keyboard has symbols representing the operations and parameters to be selected thereby, with provision for reviewing the operating sequence of any program without actually carrying out the photographic sequence.

6 Claims, 2 Drawing Figures

PROGRAM CONTROL APPARATUS FOR THE PHOTOGRAPHIC OPERATING SEQUENCE OF AN X-RAY PHOTOGRAPHIC INSTALLATION

BACKGROUND OF THE INVENTION

The invention relates to a program control apparatus for the photographic operating sequence of an x-ray photographic installation.

An x-ray diagnostics installation is known for the production of angiographic photographs wherein program cards are present which function as the program storage, the particular desired program card being inserted in a control desk and transported in the control desk in step with the program operating sequence. The handling of the known installation is comparatively inconvenient due to the fact that program cards are used, for the particular desired card must be taken from a records archieve. In addition, program cards such as this are subject to attrition. Finally, the installation for scanning the respective program card represents an interference (or disturbance) factor.

SUMMARY OF THE INVENTION

The object which is the basis of the invention consists in producing a program control apparatus of the type initially cited wherein the use of program cards is not necessary.

In accordance with the invention, this object is achieved by virtue of the fact that the program control apparatus contains one electronic read-only memory (ROM) for each photographic program, the input of said ROM being connected to a resettable pulse counter which can be advanced in step-by-step fashion by means of a pulse generator, and which, corresponding to the output signals of the impulse counter, delivers program signals which are predetermined by its program, and that the outputs of all the memory circuits are connected to the components controlled by them via a program selection circuit. In the inventive program control apparatus, the program storage proceeds in a purely electronic fashion. Therefore, no scanning is necessary and the operational reliability is very great. The program selection can proceed in a simple manner by means of keys. Through the utilization of electronic read-only members, it is possible to carry out a program trial run wherein, for example, the respective predetermined values and magnitudes are optically indicated.

An expedient further embodiment of the invention consists in that, in addition to the read-only memory circuits, a freely programmable storage is provided for a freely programmable photographic program. This freely programmable storage permits the storage of any random program, in compliance with the wishes of the physician, and it permits the selection of this program when needed.

Other objects, features and advantages of the invention will be apparent from the following detailed description taken in connection with the accompanying sheets of drawings.

DETAILED DESCRIPTION

Figure 1:
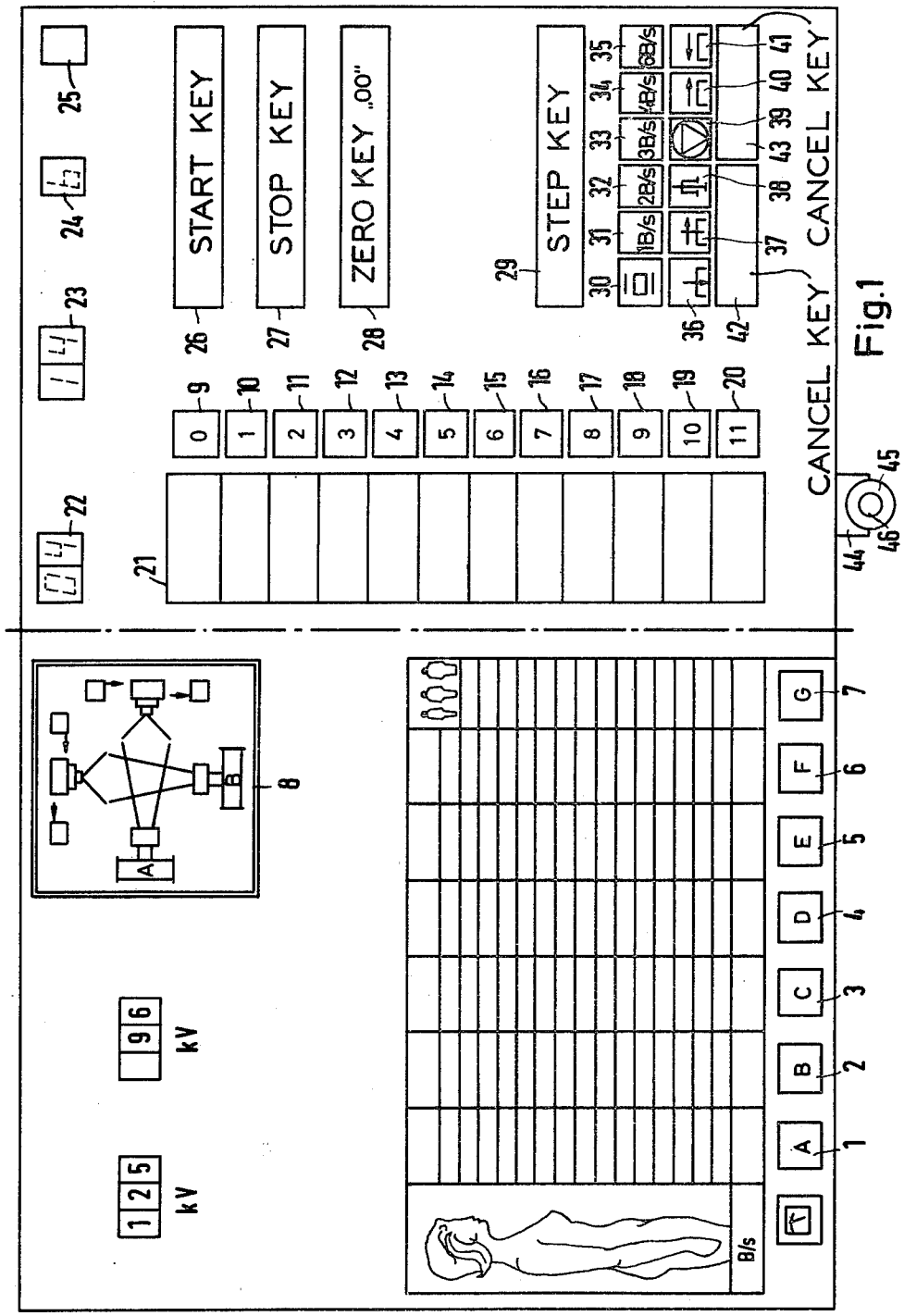
FIG. 1 illustrates a diagrammatic view of a control console of a program control apparatus in accordance with the invention.

The control desk according to FIG. 1 is known in the section illustrated to the left of the dash-dot line. In this section, there is contained a number of organ-keys 1 through 7 which permit the selection of the photographic exposure values in an organprogrammed fashion for a photograph, or a series of photographs, respectively. In the example, the control desk is illustrated as functioning for an angiography installation for the production of x-ray photographs in two planes according to diagram 8, with the aid of two series-film-photographic cameras. In addition, it contains indicator means for the x-ray tube voltage and additional magnitudes.

What is significant in terms of the invention is the right hand section of the control desk according to FIG. 1. In this section, there is a manual operation selector key 9 and eleven program selection keys 10 through 20 which are associated with an indicator field 21 in which the respective program associated with each key is indicated. In addition, there are provided an indicator field 22 for displaying the currently operative program number, an indicator field 23 for displaying the particular present time point after initiation of the selected program, an indicator field 24 for indicating the currently selected value of image frequence (B/s) (or frame repetition rate), and an indicator field 25 for signalling when the film supply is depleted. A start key 26 and a stop key 27 are present for carrying out a review of a selected program without actually carrying out the programmed photographic sequence. A zero key 28 is present for the purpose of selection of the program beginning, for example program step number "zero zero". A program can be manually advanced step-by-step by means of a transport or step key 29. In addition, keys 30 through 41 are provided with symbols of the selectable operating modes and magnitudes. These keys have two functions; namely, to indicate the respective value for each program step during checking of the selected program, on the one hand; and to freely program a random program when key 20 is depressed, on the other hand. A new program generated by means of the keys 30 through 41 can be entirely cancelled by means of a cancel key 42. A cancel entry key 43 is present for the purpose of cancelling the last selected program step during generation of a program by means of the keys 30 through 41.

If key 9 is depressed, no automatic program operating sequence of a photographic series takes place. In this case, the physician actuates one of organ keys 1 through 7, and manually selects the other values in a non-illustrated fashion. If one of the fixedly predetermined photographic programs which are selectable by means of keys 10 through 19 is to be selected, one of these keys is depressed. In the example, key 13 representing program number 04 is depressed and, accordingly, number 04 appears in indicator field 22. The predetermined program number 04 associated with key 13 can be examined by actuating start key 26. The timesequence of the program is then indicated in seconds in field 23, and keys 30 through 41 light up in compliance with the respective adjusted values of the respective program steps. For control purposes, this automatic program operating sequence can be arrested by pressing key 27. In addition, a return to the initial point of the program (program step "00")is possible by pressing zero key 28. In this instance, the indication "00"appears in indicator field 23, and the program operating sequence can begin again.

If the program selected by means of one of keys 10 through 19 is to be actually run, a start switch 45, which is suspended in a support mounting 44, is taken in hand and its button 46 is actuated. The selected program now runs automatically; i.e., first a contrast means injection is automatically undertaken, for example, (key 38 lights up), then a series of photographs takes place in the course of two seconds with an image frequence (or frame repetition rate) of six images per second, for example, (key 35 lights up), then a table displacement takes place, etc. Respective keys 30 through 41 are thereby illuminated as the corresponding program step becomes active.

If key 20 is actuated, it is possible to input a random photographic program by means of transport or step key 29. For this purpose, the necessary values are first inputted for the first program step (0. -1. sec.) by means of keys 30 through 41. Subsequently, transport key 29 is actuated, and the necessary values for the second program step (program step number 01) are inputted by means of keys 30 through 41, and so on. Cancel key 42 permits cancellation of the entire manually inputted program, whereas cancel key 43 renders possible cancellation of the last inputted program step.

Figure 2:
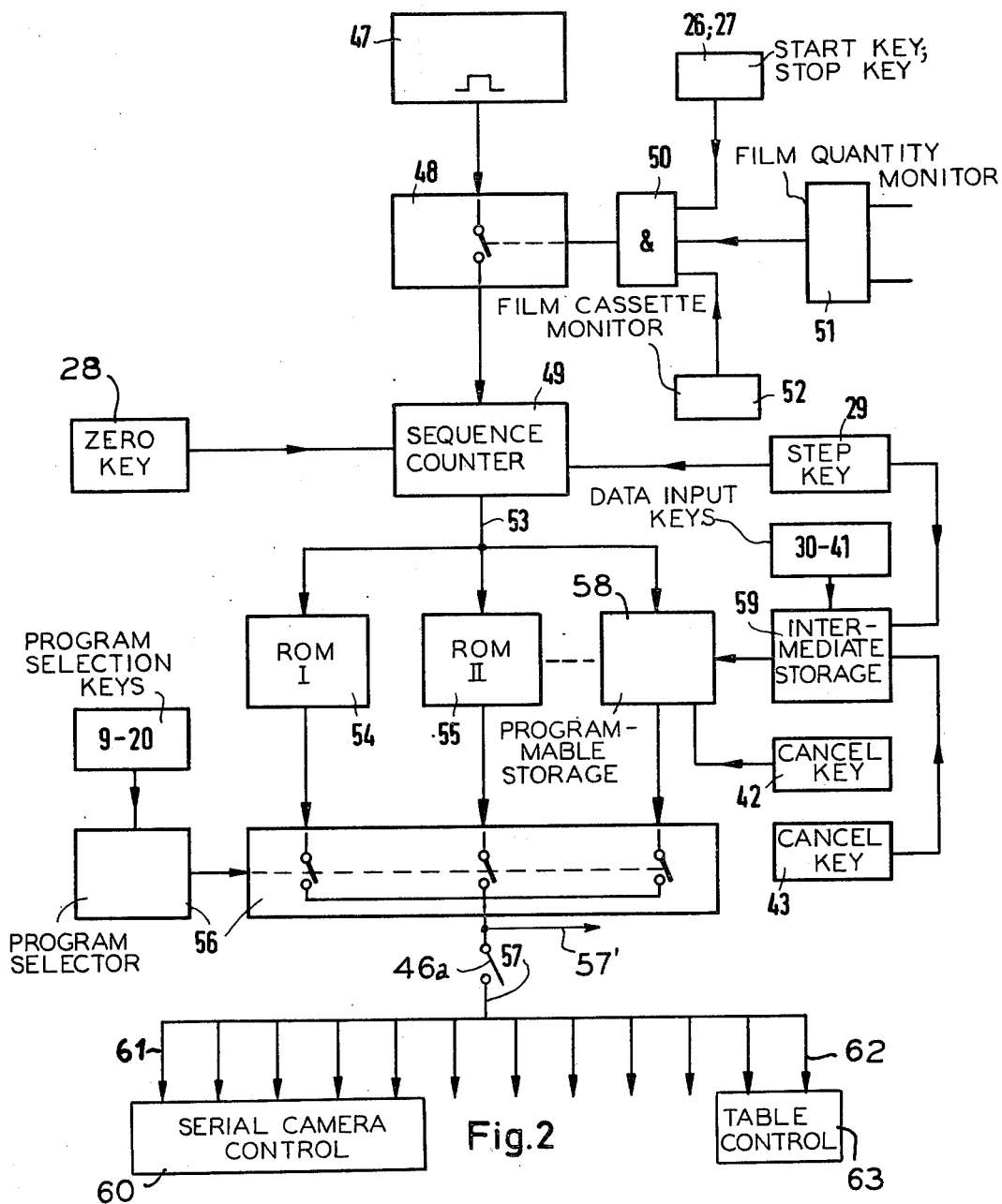
FIG. 2 shows an illustrative circuit diagram for the program control apparatus in accordance with the invention.

FIG. 2 illustrates a pulse generator 47 which supplies one output impulse per second to a gate circuit 48. The output of gate circuit 48 is connected to a step-shift or sequence counter circuit 49. Gate circuit 48 is actuated by an AND-connection 50 to whose inputs keys 26 and 27, as well as film-quantity-monitoring-device 51 and a monitoring device 52 for the film receiving cassette of each film camera are connected. If start key 26 is depressed, if the necessary film quantity is present, and if the film receiving cassette is empty, the AND-connection 50 closes gate circuit 48, and the impulses of pulse generator 47 are conveyed to the stepshift circuit 49; i.e., the photographic program begins. The step-shift circuit 49 delivers a signal at its output 53 which denotes the respective step (i.e. of steps 00 through 99, decimal, for example) and which is conveyed in parallel fashion to a plurality of read-only memory circuits whose number is equal to the number of program keys; thus, in the example, this number corresponds to ten program keys. The output information of the step-shift circuit 49, said output information characterizing the respective step and thus the respective second of time, causes all memory circuits 54, 55, etc. to deliver signals at their outputs, said signals determining the photographic operating modes and exposure values corresponding to the respective chronological step; for example, the image frequency (or frame repetition rate) of the film camera, the table position, the focus of the x-ray tube, etc. Via program selection circuit 56, only one of the memory circuits 54, 55, 58, etc., is connected in each instance to output 57 leading to the components to be controlled. As an example, FIG. 2 illustrates a series-photographic camera control 60 which is controlled via lines such as line 61 with regard to its image frequency (or frame repetition rate). In addition, a control 63 for the table plate displacement is illustrated, said control being set to effect a desired displacement via lines such as 62.

Associated with key 20 is a freely programmable storage 58 to which an intermediate storage 59 is series connected. Storage 58 can be cancelled by cancel key 42, whereas intermediate storage 59 can be cancelled by cancel key 43. Transport key 29 is likewise connected to intermediate storage 59 and to sequence counter circuit 49. Finally, keys 30 through 41 are also connected intermediate storage 59.

In order to freely program storage 58, the desired combination of values for a given program step is inputted into intermediate storage 59 by means of keys 30 through 41. If, subsequently, transport or step key 29 is actuated, the contents of intermediate storage 59 is transferred into storage 58 at the address currently output from sequence or address counter 49. The next combination of values associated with the next program step can be inputted into intermediate storage 59 by means of keys 30 through 41, whereupon actuation of transport key 29 causes the transfer of the selected combination of values into the current address of storage 58, and so on.

The entire contents of storage 58 can be cancelled by actuating cancel key 42, whereas the combination of values which has been inputted last, respectively, can be cancelled by actuating cancel key 43.

The invention has been described in connection with an angiography installation comprising one or more series-photographic-cameras. However, in principle, the invention is applicable in the case of any x-ray diagnostics installation wherein a specific program operating sequence for the production of x-ray photographs can be pre-programmed in advance. The term "program" is intended to denote a time-sequence (or chronological) program.

Each ROM circuit 54, 55, etc., can be a so-called PROM; i.e., a programmable read-only memory. The freely programmable memory 48 can be a so-called RAM (random access memory).

In terms of the automatic program operating sequence, it is important that all ROM circuits 54, 55, etc., deliver program signals at their outputs, said program signals being associated with the output (address) signals of the step-shift sequence counter circuit 49, which basically represents an impulse counter, and that only one of the ROM circuits 54, 55, etc., is selected in each instance via program selection circuit 56.

Only three memories 54, 55 and 58 are illustrated in FIG. 2. Of course, eleven memories are present in the example. This is indicated by the broken line.

It will be apparent that sequence counter 49 may comprise either a step counter with a number of count positions corresponding to the maximum number of program steps, or may comprise an ordinary binary counter with a number of binary stages so as to give the required count capacity. In the latter case, each binary stage would have an output connected with each of the memory circuits 54, 55, . . . , 58, and the binary coded output would serve to select the current program step in each of the memory circuits. For the sake of diagrammatic illustration in FIG. 2, a switch 46a is indicated which is controlled by the manual start switch button 46 of FIG. 1. FIG. 2 also illustrates a data display branch cable 57' which would serve to control the indicators associated with switches 30 through 41 whether or not the manual button 46 was actually actuated. The cable 57' would contain twelve output lines including lines corresponding to 61 and 62 of cable 57, and each line would control energization of one of the respective display elements associated with keys 30–41 so as to indicate which of the conductors of cable 57 were active for the given program step.

It will be apparent that many modifications and variations may be effected without departing from the scope of the novel teachings and concepts of the present invention.

I claim as my invention:

1. Program control apparatus for the photographic operating sequence of an x-ray photographic installation comprising a series of memory circuits for storing respective photographic program sequences, a resettable pulse counter being connected with the address input of each of said memory circuits for sequentially selecting the program steps of the respective memory circuits, a pulse generator for supplying program signals to the pulse counter for sequentially selecting the program steps of the respective memory circuits, and a program selection circuit connected with the outputs of the memory circuits for transmitting the output signals from a selected one of the memory circuits.

2. Apparatus according to claim 1 with said memory circuits comprising a series of read only memories and a freely programmable memory.

3. Apparatus according to claim 2 with a keyboard connected with the programmable memory for programming thereof, said keyboard having symbols indicating the programmable parameters.

4. Apparatus according to claim 3 with a cancel key connected to the freely programmable memory for entirely cancelling its contents, and with a further cancel key for cancelling the last inputted information.

5. Apparatus according to claim 4 with an intermediate storage for receiving inputted information by means of said keyboard and connected with the freely programmable memory, the contents of said intermediate storage being transferred to the freely programmable memory, and the first mentioned cancel key being connected to the freely programmable memory, and the second mentioned cancel key being connected to the intermediate storage.

6. Apparatus according to claim 1 with control means for controlling the production of angiographic photographs connected to the output of said program selection circuit.

* * * * *